US009495614B1

(12) United States Patent
Boman et al.

(10) Patent No.: US 9,495,614 B1
(45) Date of Patent: Nov. 15, 2016

(54) VERIFYING LABELS FOR IMAGES USING IMAGE RECOGNITION

(71) Applicant: Google, Inc., Mountain View, CA (US)

(72) Inventors: Robert C. Boman, Thousand Oaks, CA (US); John Flynn, Venice, CA (US); Farhana Bandukwala, San Clemente, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/633,704

(22) Filed: Feb. 27, 2015

(51) Int. Cl.
*G06K 9/68* (2006.01)
*G06K 9/62* (2006.01)
*G06F 17/30* (2006.01)

(52) U.S. Cl.
CPC ....... *G06K 9/6215* (2013.01); *G06F 17/30241* (2013.01); *G06K 9/6267* (2013.01); *G06K 9/68* (2013.01)

(58) Field of Classification Search
CPC ............ G06F 17/30265; G06F 17/30241; G06F 17/30268; G06F 17/30817; G06F 3/0304; G06F 3/0487; G06F 17/30038; G06F 17/30247; G06F 17/3079; G06F 17/30705; G06F 17/30864; G06K 9/00664; G06K 2209/27; G06K 9/00288; G06K 9/0063; G06K 9/00677; G06K 9/66; G06K 9/00355; G06K 9/00711; G06K 9/6211; G06K 9/00476; G06K 9/036; G06K 9/4671; G06T 7/004; G06T 7/0042; Y10S 707/99936; Y10S 707/99933; Y10S 707/99937; Y10S 707/99942; Y10S 707/9945; Y10S 707/99948
USPC ........ 382/103, 118, 159, 224, 226, 305–306, 382/190
See application file for complete search history.

(56) References Cited

U.S. PATENT DOCUMENTS

| | | | | |
|---|---|---|---|---|
| 5,867,597 A * | 2/1999 | Peairs | ............... | G06K 9/00463 382/209 |
| 6,044,171 A * | 3/2000 | Polyakov | ............... | G06K 9/522 382/159 |
| 8,352,465 B1 * | 1/2013 | Jing | ................. | G06F 17/30867 707/723 |
| 8,433,707 B2 * | 4/2013 | Wallace | .................... | G01S 5/16 707/732 |
| 8,520,949 B1 * | 8/2013 | Bissacco | .............. | G06K 9/6211 382/190 |
| 8,676,001 B2 | 3/2014 | Brucher | | |
| 2005/0063083 A1 * | 3/2005 | Dart | .................. | G06F 17/30595 360/1 |
| 2005/0080795 A1 * | 4/2005 | Kapur | ............... | G06F 17/30705 |
| 2009/0034791 A1 * | 2/2009 | Doretto | ................ | G06K 9/4647 382/103 |
| 2009/0161962 A1 * | 6/2009 | Gallagher | ......... | G06F 17/30247 382/203 |
| 2009/0208106 A1 * | 8/2009 | Dunlop | ............. | G06K 9/00664 382/173 |
| 2013/0129142 A1 | 5/2013 | Miranda-Steiner | | |
| 2013/0170738 A1 | 7/2013 | Capuozzo | | |

OTHER PUBLICATIONS

Popescu, A. et al., "MonuAnno: Automatic Annotation of Georeferenced Landmarks Images," CIVR '09, ACM, 2009; 8 Pages.
Kennedy L. et al., "Generating Diverse and Representative Image Search Results for Landmarks," WWW2008, 2008; 10 Pages.
Etherington, D., "Snapchat Adds Geofilters for Quick Image Location Tags, and a New Revenue Possibility," Jul. 15, 2014, link: http://techcrunch.com/2014/07/15/snapchat-adds-geofilters-for-quick-image-location-tags-and-a-new-revenue-possibility/ ; 6 Pages.

* cited by examiner

*Primary Examiner* — Vu Le
*Assistant Examiner* — Aklilu Woldemariam
(74) *Attorney, Agent, or Firm* — IP Spring

(57) ABSTRACT

Implementations relate to verifying labels for images using image recognition. In some implementations, a method includes obtaining an image associated with location information, obtaining one or more descriptor labels associated with the location information, determining one or more recognized image features depicted in the image, comparing the recognized image features with the descriptor labels, and determining one or more verified labels from the one or more descriptor labels. The verified labels are determined to describe at least one of the one or more recognized image features depicted in the image based on the comparing of the recognized image features with the descriptor labels.

18 Claims, 5 Drawing Sheets

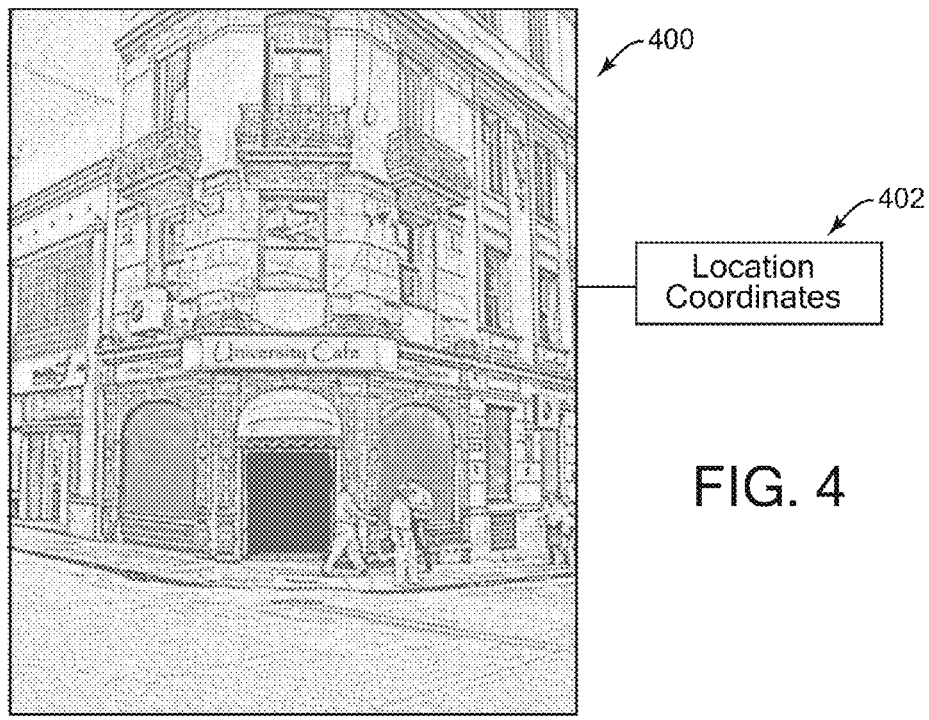
FIG. 4
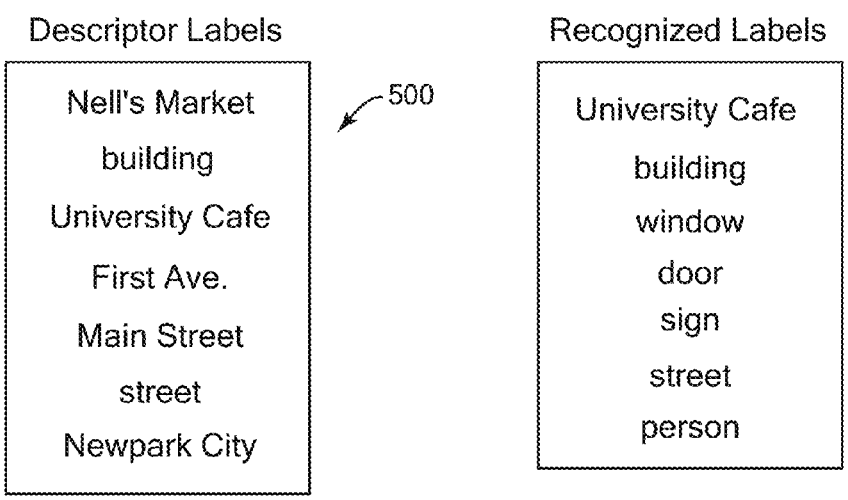
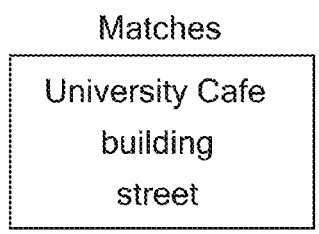
FIG. 5

US 9,495,614 B1

VERIFYING LABELS FOR IMAGES USING IMAGE RECOGNITION

BACKGROUND

The popularity and convenience of digital cameras as well as the widespread of use of Internet communications have caused user-produced images such as photographs to become ubiquitous. For example, users can keep large private collections of images. Many users of Internet platforms and services such as email, bulletin boards, forums, and social networking services post images for themselves and others to see. In some cases, labels or tags can be associated with an image, e.g., as metadata, to indicate subjects depicted in the image.

SUMMARY

Implementations of the present application relate to verifying labels for images using image recognition. In some implementations, a method includes obtaining an image associated with location information, obtaining one or more descriptor labels associated with the location information, determining one or more recognized image features depicted in the image, comparing the recognized image features with the descriptor labels, and determining one or more verified labels from the one or more descriptor labels. The verified labels are determined to describe at least one of the one or more recognized image features depicted in the image based on the comparing of the recognized image features with the descriptor labels.

Various implementations and examples of the method are described. For example, the method can further include storing verified labels as associated with the image. The method can further include causing at least one of the descriptor labels that do not describe at least one of the one or more recognized image features to be unassociated with the image. The location information can include Global Positioning System (GPS) location information associated with the image as metadata. The descriptor labels can originate from one or more data sources that store the descriptor labels in association with the location information. The descriptor labels can include at least one of: a proper name of a geographic feature, and a generic descriptive term for a geographic feature, and the geographic features can include at least one of: a monument, a landmark, a building, and a landscape feature.

The recognized image features can be recognized in the image based on one or more object recognition techniques. Comparing the one or more recognized image features with the one or more descriptor labels can include comparing one or more recognized labels, associated with the recognized image features, with the one or more descriptor labels. Determining the one or more verified labels can include checking for one or more matches between the descriptor labels and the recognized image features, where a matching descriptor label is a verified label. For example, the matches can be determined based on checking for a predetermined threshold amount of similarity found between the descriptor labels and the recognized image features.

The method can further include examining the one or more descriptor labels without examining content of the image to determine whether one or more possible discrepancies are present between at least one of the descriptor labels and the content of the image, where the determining of the one or more recognized image features is performed only in response to determining that the one or more possible inconsistencies are present. For example, the recognized image features can be determined only in response to determining that there are a plurality of descriptor labels associated with the location information and obtained from the one or more data sources.

The method can further include storing one or more of the recognized labels as verified labels associated with the image. The method can further include checking at least one of the descriptor labels that do not match at least one of the one or more recognized image features based on one or more predetermined characteristics or conditions allowing the at least one descriptor label to be associated with the image. The method can further include causing the image and the one or more verified labels to be available as a search result for searches input by a user for information in the one or more descriptor labels.

In some implementations, a system can include a storage device and at least one processor accessing the storage device and operative to perform operations. The operations can include operations similar to the features of the method described above. Some implementations can provide a computer readable medium having stored thereon software or program instructions that, when executed by a processor, cause the processor to perform operations similar to the features of the method described above.

BRIEF DESCRIPTION OF THE DRAWINGS

FIG. 4 is a diagrammatic illustration of an example image and information that can be processed using one or more features described herein;

FIG. 5 is a diagrammatic illustration of example labels used with the image of FIG. 4 and with one or more features described herein;

DETAILED DESCRIPTION

Figure 1:
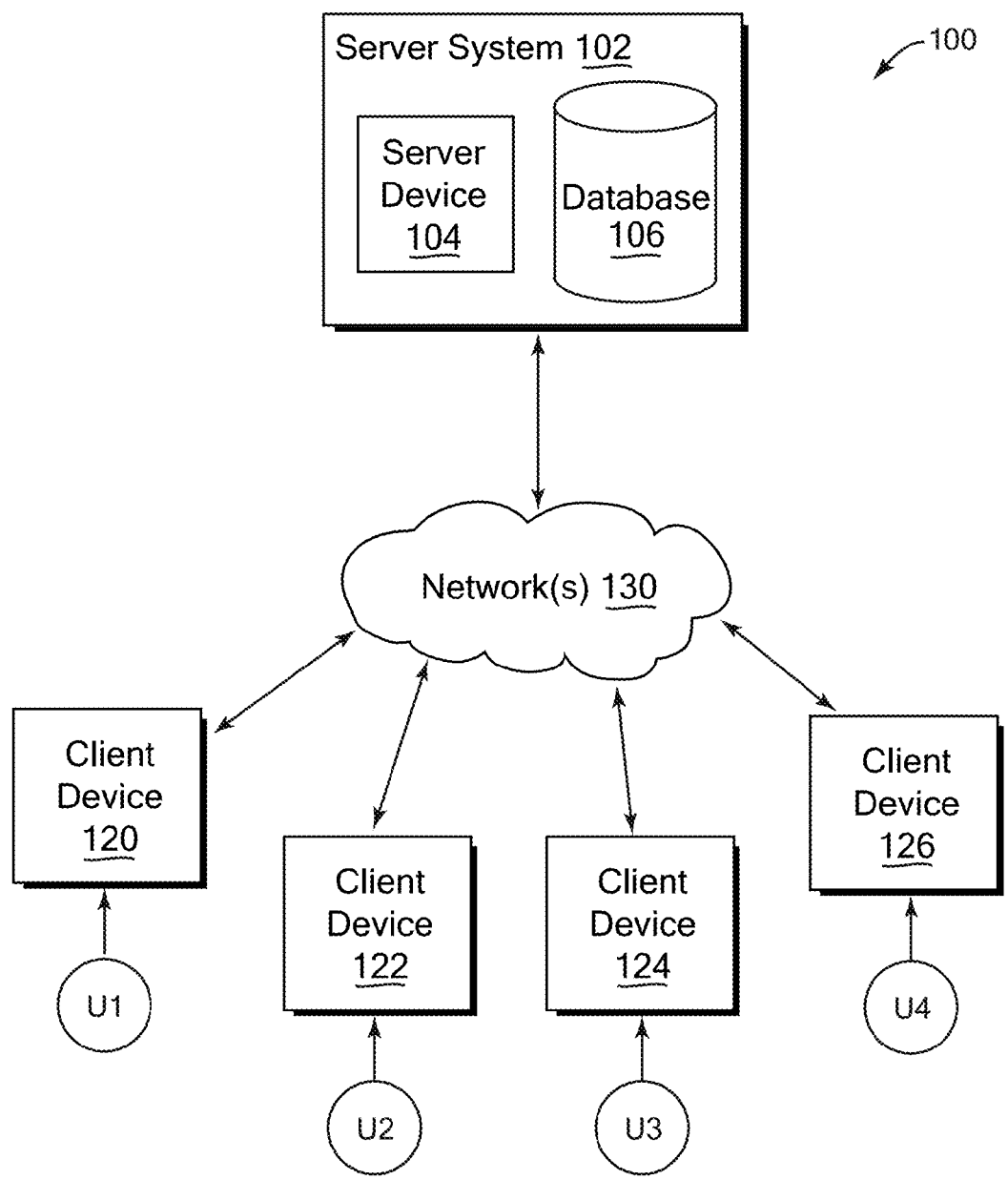
FIG. 1 is a block diagram of an example network environment which may be used for one or more implementations described herein.

One or more implementations described herein relate to verifying labels for images. In some implementations, a system can verify that labels associated with an image describe features depicted in the image. For example, a system can obtain an image such as a photo that is associated with location information indicating the location where the image was captured. The location information can include, for example, GPS coordinates or other location information stored as image metadata by a camera taking the photo or other device. The system also obtains one or more descriptor labels that are (or will be) associated with the location of the image and are intended to describe the content in the image. The descriptor labels can be (currently or previously) auto-generated, e.g., obtained from a database that stores geographical locations and the descriptor labels associated with those locations, where such descriptor labels including proper names of features depicted in the image (business, landmarks, monument, street name, etc.), as well as generic terms describing the features in the image. In some examples, to obtain the descriptor labels, a system can match the location information of the image with location information in the database to find any descriptor labels in the database that are associated with that location, e.g., using reverse geolocation.

In some cases, one or more of the obtained descriptor labels may be incorrect or inaccurate with regards to the associated image, e.g., there may be a discrepancy between one or more of the obtained descriptor labels and the content of the image. This can occur due to any of several reasons, including ambiguous or too-coarse location coordinates for the image, inaccurate GPS sensor used for the image, incorrect descriptor labels stored in the database, etc. Or, descriptor labels may correctly describe features at a location, but some of those features are not actually depicted in the image due to not being in view of the camera when the image was captured, making those labels incorrect for a particular image. For example, the image may depict only a restaurant, but if there are several businesses at or near the location information associated with the photo, there may be descriptor labels from a location database that describe all of these different types of businesses, proper names, and/or generic terms that all match the location of the image and are thus associated with the image. In this case, some of these labels may be incorrect with regard to the actual depicted image content.

Features described herein cause image recognition to be performed on the content of the image to determine one or more image features depicted in the image. For example, the system can use any of several well-known object recognition and other image recognition techniques, e.g., by comparing regions and features in the image to stored image patterns, and thus identifying features in the image based on matching patterns. Text in the image (e.g., on signs) can also be recognized. The recognized features include any types of features, including geographic features such as landmarks, business buildings, landscape features, signs, components or portions of objects and other features, etc., and the system can recognize such features to find associated recognized labels such as proper names (e.g., Joe's Cafe) and/or generic terms (cafe, building) associated with matched patterns and/or otherwise obtained from an image recognition database. In some implementations, the system only performs the image recognition if it is determined that there may be possible discrepancies between labels and image content, e.g., if there are multiple descriptive labels for a location, some of which may not be depicted in the image.

The system compares the recognized image features (e.g., recognized labels) to the descriptor labels for the image to verify whether the descriptor labels describe features in the image. Descriptor labels that match the recognized features (e.g., in proper name, generic name, etc.) are considered verified and correct, while descriptor labels that do not match the features can be considered incorrect and can be unassociated with the image, e.g., ignored or discarded. Some implementations can examine unmatched descriptor labels for characteristics or conditions that allow those labels to be associated with the image. The system can perform such verification at various stages in various implementations. For example, an image can be verified upon being uploaded to a server for storage, or when stored locally on a camera or other client device. In other implementations, a navigation application on a client device can use the verification method to verify where the client device is located based on location information, and need not store captured images.

These and other described features allow a system to find discrepancies between content of an image and labels that were automatically provided for that image from data sources, e.g., based on location information such as GPS coordinates of the image. The system can correct such discrepancies, allowing images to have labels accurately descriptive of the associated image content. Thus, operations described herein can increase the accuracy of labels for images. Implementations can allow users to, e.g., classify, categorize, and search for photos and other images more accurately based on accurate labels. Consequently, a technical effect of one or more described implementations is that search, organization, and access of images based on associated image labels is reduced in time and resources expended to obtain accurate results. A further technical effect is a reduction in the time and resources needed to achieve the editing of inaccurate labels for images.

Herein, an image feature can refer to an object depicted in the image, an element or characteristic of a depicted object (e.g., a portion, surface, component, or side of an object colored, shaped, or textured differently than other portions), a shading, coloration or other area or patch of the image, a background object or area behind one or more depicted objects, a depicted geographic feature, etc. A geographic feature can refer to features commonly designated on maps of physical areas. For example, a geographic feature can be any feature visible at a location that is sufficiently permanent in its location to be stored in available maps or databases. In some implementations a geographic feature can include unmoving (e.g., permanent or semi-permanent) landscape features (e.g., valley, hill, mountain, forest, lake, river, etc.), or an unmoving artificial object or structure (e.g., business or other organizations' building, building complex, monument, landmark, bridge, tunnel, road, street, etc.). Some features described by descriptor labels (e.g., by a proper name) can include artificially-defined, non-depicted areas or regions such as countries, states, provinces, cities, neighborhoods, locations indicated by postal or other address information (street number, postal code, etc.), etc. Such features may be unlikely to be depicted in an image (unless referred to via names on signs, etc.), but can be described in a descriptor label, e.g., an area in which the geographic location of the location information is situated. A geographic location can refer to a physical location able to be designated on a global scale, e.g., latitude and longitude, or a physical location positioned with reference to another known location (e.g., town or city location, etc.).

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a database 106 or other storage device. Network environment 100 also can include one or more client devices, such as client devices 120, 122, 124, and 126, which may communicate with each other via network 130 and/or server system 102. Network 130 can be any type of communication network, including one or more of the Internet, local area networks (LAN), wireless networks, switch or hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. Each client device can be any type of electronic device, such as a computer system, portable device, cell phone, smart phone, tablet computer, television, TV set top box or entertainment device, personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In some examples, users U1, U2, U3, and U4 may interact with each other via a social network service or other type of network service implemented on server system 102, where respective client devices 120, 122, 124, and 126 transmit communications and data to one or more server systems such as system 102, and the server system 102 provides appropriate data to the client devices such that each client device can receive shared content uploaded to the social network service via the server system 102. In some examples, the social network service can include any system allowing users to perform a variety of communications, form links and associations, upload and post shared content such as images, video, audio, and other types of content, and/or perform other socially-related functions. For example, the social network service can allow a user to send messages to particular or multiple other users, form social links in the form of associations to other users within the social network system, group other users in user lists, friends lists, or other user groups, post or send content including text, images, video sequences, audio sequences or recordings, or other types of content for access by designated sets of users of the social network service, send multimedia information and other information to other users of the social network service, participate in live video, audio, and/or text chat with other users of the service, etc. In some implementations, a "user" can include one or more programs or virtual entities, as well as persons that interface with the system or network.

A user interface can enable display of images, video data, and other content as well as communications, privacy settings, notifications, and other data on a client device 120, 122, 124, and 126. Such an interface can be displayed using software on the client device, such as application software or client software in communication with the server system. The interface can be displayed on an output device of a client device, such as a display screen.

Other implementations can use any type of system and service. For example, any type of electronic device can make use of features described herein. Some implementations can provide features described herein on client or server systems disconnected from or intermittently connected to computer networks. In some examples, a client device having a display screen can display images and provide features and results as described herein that are viewable to a user.

Figure 2:
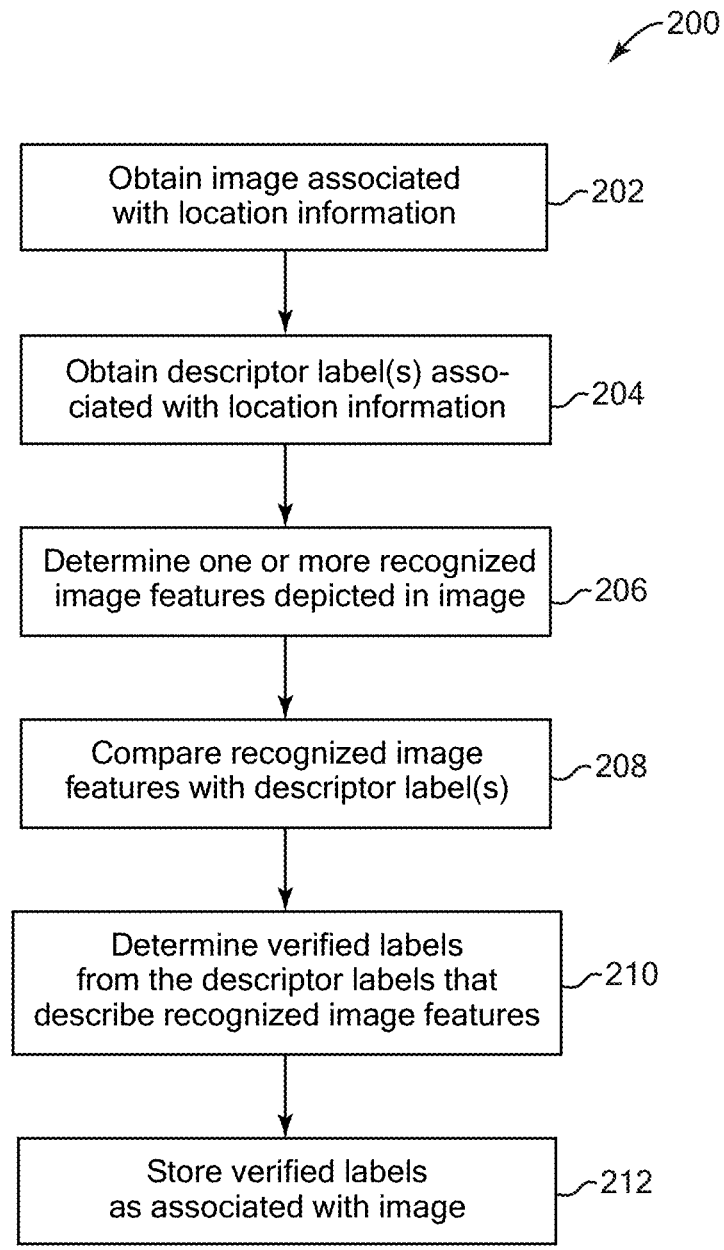
FIG. 2 is a flow diagram illustrating an example method for verifying descriptor labels associated with images, according to some implementations.

FIG. 2 is a flow diagram illustrating one example of a method 200 for verifying labels associated with images. In some implementations, method 200 can be implemented, for example, on a server system 102 as shown in FIG. 1. In other implementations, some or all of the method 200 can be implemented on a system such as one or more client devices 120, 122, 124, or 126 as shown in FIG. 1, and/or on both a server system and a client system. In described examples, the implementing system includes one or more processors or processing circuitry, and one or more storage devices such as a database 106 or other storage. In some implementations, different components of one or more servers and/or clients can perform different blocks or other parts of the method 200.

Method 200 can be implemented by program instructions or code, which can be executed on a computer, e.g., implemented by one or more processors, such as microprocessors or other processing circuitry and can be stored on a computer program product including a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, method 200 can be implemented in hardware (logic gates, etc.), or in a combination of hardware and software. The method 200 can be performed as part of or component of an application running on the system, or as an application or software running in conjunction with other applications and operating system.

In some implementations, the method 200 (or method 300, described below) can be initiated automatically by a system. For example, the method (or portions thereof) can be periodically performed, or performed based on one or more particular events such as one or more images being newly uploaded to or accessible by the system, or one or more conditions specified in custom preferences of one or more users of the system. In one non-limiting example, a camera, cell phone, tablet computer, wearable device, laptop computer, or other client device can capture an image and can perform the method 200. In addition or alternatively, the device can send a captured image to a server over a network (and send any other needed information, e.g., location information), and the server can process the image using method 200. Some implementations can initiate method 200 based on user input. A user may, for example, have selected the initiation of the method 200 from an interface such as a social networking interface, application interface, or other interface.

In block 202 of method 200, the method obtains an image for processing. The image can be a digital image composed of multiple pixels, for example, and can be stored on one or more storage devices of the system or otherwise accessible to the system, such as a connected storage device, e.g., a local storage device or storage device connected over a network. In various implementations, the image can be automatically selected by the method, e.g., as an image that has been uploaded by a user to a server over one or more networks, or an image from an album or other stored collection of multiple images owned by a user. For example, an album can be locally stored and accessible by the system performing method 200, and/or can be remotely stored on a server or client device, such as an album provided in an account of a user of a social networking system or other network service. In some implementations, the system can determine which image to obtain based on evaluating one or more characteristics of accessible images, such as the color distributions of images, timestamps and/or other metadata of images, etc. Alternatively, a user can input, provide, or designate one or more images to process.

The obtained image is associated with location information. The location information indicates a geographic location with reference to a known coordinate system or other known location reference, e.g., latitude and longitude values referencing a standard global coordinate system or location system. For example, the location information can be sensed by one or more sensors of a device that captured the image or by a device at or near the location where the image was captured. The location information can be associated with the image as stored metadata that can be embedded in the image data, or can be stored separately from the image and referenced by data embedded in the image or otherwise associated with the image.

In block 204, the method obtains one or more descriptor labels associated with the location information. The descriptor labels are based on the location information. For example, in some implementations, descriptor labels can be obtained by the method 200 from one or more data sources, e.g., local or remote (over a network) databases or other storage devices, by requesting or finding descriptor labels stored at the data sources which are associated with the location information. The method can obtain the descriptor labels from any of a variety of data sources accessible by the method, e.g., by accessing or searching a local database, communicating with a server or database over a network, etc. In some implementations, the method 200 can obtain the descriptor labels from the image. For example, the descriptor labels may have been previously associated with image, e.g., as metadata embedded in the image or stored in association with the image, and in some implementations were originally obtained from one or more data sources based on the labels' association with the location information. The descriptor labels can be text or other information that describe one or more geographic features located approximately at the geographic location associated with the image, and/or describe areas or addresses in which the geographic location is located.

In block 206, the method determines one or more recognized image features depicted in the image. For example, any of several well known image recognition techniques, including object recognition techniques, can be used to detect the image features in the image. In some implementations, the recognized image features are recognized geographic features depicted in the image. Some examples are described below with reference to FIG. 3. In block 208, the method compares the recognized image features with the one or more descriptor labels. For example, in some implementations the descriptor labels can be compared to recognized labels that are associated with the recognized features in the image.

In block 210, the method determines verified labels from the obtained descriptor labels that describe at least one of the recognized image features. This can be performed based on the comparisons made in block 208. For example, descriptor labels that are not matched or found sufficiently similar to recognized image features can be considered incorrect, and descriptor labels that are matched or sufficiently similar to recognized image features are considered correct for accurately indicating the content of the image and thus verified.

In block 212, the method can store the verified labels as associated with the image, e.g., as metadata of the image. Descriptor labels that do not describe any of the recognized image features can be ignored for block 212, or those labels can be unassociated from the image (if previously associated with the image).

Method 200 thus allows labels to be associated with an image, where the labels have been verified as to their accuracy in describing one or more features depicted in the images. This causes accurate labels to be associated with images, allowing more accurate manipulation of images based on searches, categorization, etc. that use the information in the labels. For example, the verified labels can be used for categorizing images as well as searching for images depicting particular subjects input as search terms.

Figure 3:
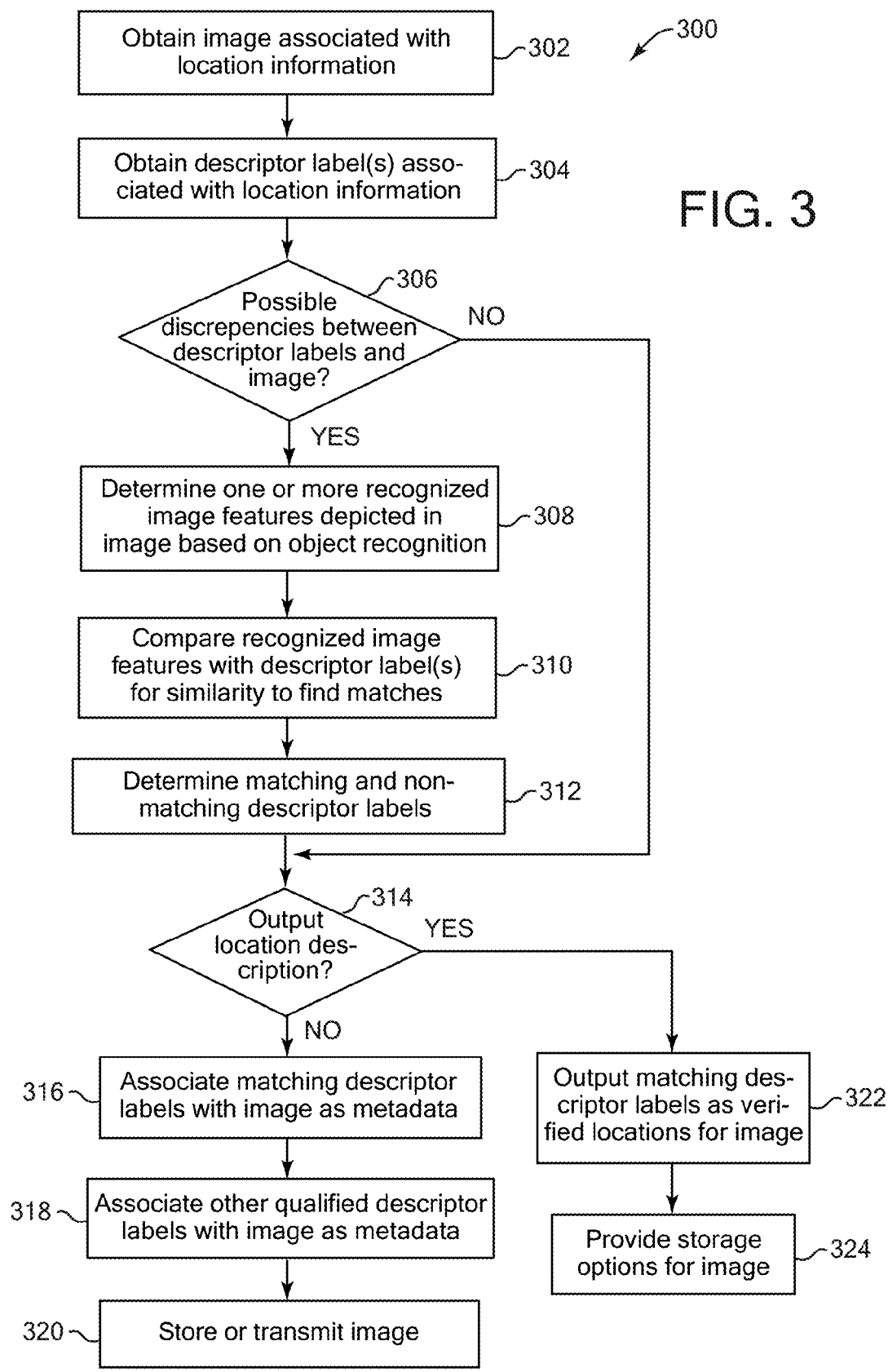
FIG. 3 is a flow diagram illustrating another example method for verifying descriptor labels associated with images, according to some implementations.

FIG. 3 is a flow diagram illustrating another example 300 of a method for verifying descriptor labels associated with images. Method 300 can be implemented by system(s) similarly as described above for method 200.

In block 302 of method 300, the method obtains an image for processing. This block can be similar to block 202 of method 200 described above. Similarly as in method 200, the obtained image is associated with location information. The location information indicates a physical, geographic location with reference to a known coordinate system or other known location reference. For example, in some implementations the location information can be latitude and longitude values referencing a standard global coordinate system or location system. Other systems can use a location system designating a location with reference to other defined reference locations. The location information can be associated with the image as stored metadata that can be embedded in the image data, or can be stored separately from the image and, e.g., referenced by data embedded in the image or otherwise associated with the image.

In some examples, the geographic location information may have been determined by a Global Positioning System (GPS) sensor provided in the device that captured the image, e.g., a camera or a camera component of a portable device such as cell phone, tablet computer, wearable device, etc. For example, the device can sense the geographic location of the device approximately at the time the device captures an image, and associate that geographic location as information with the captured image. In some implementations, the geographic location information may have been sensed by a locating device different than the device capturing the image and which is located at or near the location of image capture, and the sensed location information is, for example, later added to or otherwise associated with the image.

In some implementations, the location information can indicate a geographical area within a particular tolerance or accuracy. For example, the location information can indicate a particular geographic point within plus or minus 100 yards or other tolerance. In some implementations, the location information can indicate a geographic region within which the image was captured. For example, the location information can include or describe multiple points, locations and/or boundaries that define a geographic area. Some implementations can define multiple regions with the location information, e.g., one or more nested regions, such as a defined region within a larger defined region.

The location information is intended to indicate the geographic location of the capture of the image. In some implementations, the location information is intended to indicate the location of the image capture device approximately at the time that the image was captured. In some cases the sensors of the locating device may be inaccurate, subject to interference, or otherwise not functioning properly, thus causing an inaccurate or incorrect location to be sensed for the location of image capture.

In block 304, the method obtains one or more descriptor labels associated with the geographic location information. For example, the descriptor labels can originate from one or more data sources. In various examples, the descriptor labels can specify names, e.g., a proper name of a particular feature, such as a proper name of a business establishment, building, structure, monument, landmark, bridge, tunnel, gate, rock formation, summit point, river, or lake at the geographic location, and/or a proper name of an area in which the geographic location is situated, e.g., name of country, state, city, park, landscape feature (e.g., valley, hill, mountain, forest, etc.), etc. Descriptor labels can specify physical address information, e.g., street names and numbers, zip codes, etc. Some descriptor labels can specify generic descriptive terms, e.g., one or more words, symbols, or other information describing a type, category, or class of geographic feature at the geographic location, such as "building," (or class of building, e.g., "skyscraper," "restaurant," "church," "cathedral," "stadium," etc.), "street," "mountain summit," "bridge," "lake," etc.

The method can obtain one or multiple descriptive labels. For example, both a generic descriptive word and a particular proper name describing the same feature at the geographical location may be stored at the data source for the location and can be obtained in block 304. In some cases, multiple descriptive labels can indicate that multiple geographic features are located within an area considered to be located at the associated geographic location. In one example, in association with a particular location described by a set of GPS coordinates, a data source may store a descriptive label for each of various geographical features including a store, a restaurant, a monument, and a valley that are located within (or encompassing) a predetermined area or range centered on the GPS coordinates. In such a case, the location information can be considered approximate and/or ambiguous in that it is not precise enough to precisely point to just one of these geographical features.

The method can obtain the descriptor labels from one or more data sources, and/or from the image. For example, in some cases, descriptor labels can be obtained by the method 300 from one or more accessible data sources, e.g., by requesting or finding descriptor labels stored at the data sources which are associated with the location information. In various implementations, the method can search for and access descriptor labels stored at the one or more data sources, and/or can request for and receive the descriptor labels from another device or system that acts as a data source, e.g., by sending the geographic location in the request. For example, if the method is performed on a device connected to a network (e.g., LAN, Internet, etc.), then databases and/or servers accessible over the network can be accessed and the descriptor labels accessed or received by the method 300.

In some examples, the method can obtain descriptor labels that have been previously associated and stored with particular geographic locations at the data sources. For example, a database or server may store a large number of different geographic locations, and for each such location, may store one or more descriptor labels associated with that geographic location (as well as additional metadata about the location, in some implementations). In another example, each entry in a location database can represent a particular location using a unique identifier. The identifier has a geographic location (e.g., latitude and longitude) associated with it, along with one or more descriptor labels, e.g., one or more proper names and/or one or more generic descriptive terms for features at the location. Various implementations can define an area or physical range that defines an area that is associated with each identifier, such that any location in that area is associated with that identifier. In some implementations, one or more indexes can be created for the location and label data, where the indexes can be keyed on types of descriptor labels (e.g., proper name, type of location, etc.), to allow fast lookup.

For example, the stored descriptor labels associated with locations may have been previously provided by administrators, users of the database, client devices accessing the database, etc. Devices can request and/or access the database to retrieve descriptor labels for particular locations at which images have been captured, and associate those received labels with captured images. In some cases, the geographic location provided by the device may not be accurate or specific enough to determine accurate labels. For example, an error may exist in the latitude and/or longitude of the determined location of the device. Or, the device may only be able to determine its location within a large area tolerance, e.g., about 100 meters, where several geographic features may be located within that area. For example, the device may not be able to determine, based on determined location information, a single particular store or other business in a shopping mall, or whether the device is located at a street between two stores or in one of those two stores.

In some implementations or cases, the method can obtain one or more of the descriptor labels from the image instead of (or in addition to) requesting one or more data sources for descriptor labels. For example, the descriptor labels can be previously associated with image, e.g., as metadata embedded in the image or stored in association with the image (e.g., stored separately from the image and referenced by data embedded in the image). For example, the descriptor labels can be previously, originally obtained from one or more data sources based on their association with the geographic location information as described above.

In some implementations, descriptive labels can be obtained for an associated location that describe defined hierarchies of features located at the location. For example, one descriptive label can describe a higher-level feature, such as a region, e.g., a park, city, or other area. Other obtained descriptive labels can describe lower-level (e.g., more detailed) features located within that region, such as a monument, river, building, etc. In another example, descriptive labels for individual stores can be at a lower level of hierarchy and included within a shopping mall area defined by a higher-level descriptive label. An indication of this hierarchical relationship can be stored in or in association with the descriptor labels, in some implementations. Referring to the mall example above, a store descriptive label can include a reference or pointer to the related higher-level descriptor label describing the shopping mall, and the shopping mall descriptor label can include references to all the lower-level store labels included in the shopping mall.

In some implementations, the location is specified with sufficient precision that a predetermined distance radius is specified around the location so that the data sources store associated descriptor labels describing geographic features within that distance radius. In addition, some implementations can provide an associated weight or distance indicator that is stored in association with the descriptive label and indicates the distance (or how closely) from the feature described by the label to the associated location. In one example, the distance indicator can indicate relative closeness or distance to the associated location with respect to the distance of other features described by other descriptive labels to the associated location. For example, a monument very close to an associated location can have an associated higher distance indicator value, while a gift shop building further away from the associated location can have an associated lower distance indicator value, within a predetermined normalized value range. In some implementations, the data source or server can assign such distance indicators to descriptive labels dynamically based on the location provided to the data source or server by the method 300. The associated distance indicators can be used to influence determination of matches and/or verifications of labels as described below. Some implementations can provide direction indicators stored in association with descriptor labels, e.g., indicating a direction or orientation of the described geographical feature with respect to the associated location, e.g., specified as a predetermined angle from a reference direction or in another format.

In block 306, the method can examine the obtained descriptor label(s) to check if there are one or more possible discrepancies between the labels and the content of the image (e.g., image features depicted in the image). A possible discrepancy can exist if the method determines that there are one more factors present indicating that one or more of the descriptor labels may not describe any features depicted (in whole or in part) in the associated image, thus causing those descriptor labels to incorrectly describe the image content.

In some implementations, the possible discrepancies checked in block 306 can be based on examining only the descriptor labels and not based on examining the image content. For example, the results of this check can be used to determine whether or not to proceed with image content recognition for the image as described below in block 308. For example, if in some implementations image recognition consumes significant processing time and/or resources, then block 306 can help determine whether to proceed with or skip the image recognition, thus saving time and/or resources in some cases in which a possible conflict is not considered to be likely and the image recognition can be skipped or omitted.

In some implementations, a factor indicating the possible discrepancy between labels and image content can be the presence of multiple descriptor labels. For example, having multiple descriptor labels for a geographic location can indicate that there may be multiple geographic features at the geographic location. Since the image may not depict all of these geographic features, one or more descriptor labels may not accurate describe the image content. In some implementations, this check is for multiple descriptor labels of the same type for the location, e.g., generic descriptor type and proper name type of labels. For example, the method can check if there are multiple generic descriptor labels. In one example, if the generic descriptor labels "monument" and "lake" are both obtained in block 304 for the geographic location, then the method can consider there to be a possible discrepancy (while a generic label and a proper name label would not indicate a possible discrepancy). In another example, the presence of multiple proper name labels (e.g., "Joe's Cafe" and "Maggie's Deli") can indicate a possible discrepancy. In some implementations, the method can distinguish proper name labels from generic labels based on lookups of a stored dictionary or other database lookups, lookups of known business names and other known proper names in directories and other databases, and/or analysis of the label text for characteristics such as capitalization or apostrophes (possibly indicating proper names), etc.

Some implementations can look for other factors in the obtained descriptor labels to indicate possible discrepancies between labels and image content. For example, some implementations can consult predetermined rules based on the presence of particular labels. In one example, there may be a rule instructing that a possible discrepancy is present if any descriptor labels from a predetermined list of labels have been obtained for the image, such as particular named monuments, buildings, or other small geographic features that may not have been in the view of the camera during capture of the image due to their smaller size.

In some implementations, the method can check whether any descriptor labels of a particular type (e.g., proper name or generic descriptive) can be removed from consideration for possible discrepancy. For example, in some implementations, a descriptor label can be considered to have no possible discrepancy if it states or describes a non-depicted feature, such as a name of a region or area (name of state, country, etc.), that typically is not depicted in an image, and/or which cannot easily be detected or recognized in image content using utilized image recognition techniques. (Other implementations can allow descriptor labels of such an non-depicted feature to be considered for possible discrepancies, e.g., if the feature can be identified indirectly from object recognition recognizing other features depicted in the image, such as a unique or distinguishable monument, building, etc.) In some implementations, multiple labels may be considered to have no possible discrepancy if there is no considered ambiguity or overlap in description provided by those labels, e.g., if those labels are not at the same descriptive level. Some examples can include non-depicted descriptive labels indicating an overall, larger-scale region or area, such as city names, state or province names, country names, etc., which are at a different, higher descriptive level than smaller features such as buildings, business complexes, monuments, landmarks, bridges, etc. In one example in which the only descriptor labels are "Golden Gate Bridge" and "California" for an image, these labels can be considered to not have possible discrepancy because the first label describes a feature that can be depicted in the image and the second label describes a higher-level feature which does not overlap the first label. In contrast, descriptor labels of "California" and "Nevada" are at the same descriptive level (e.g., states), and thus overlap, and could be considered a possible discrepancy in some implementations (e.g., if the method implementation allows such non-depicted labels to be so considered). Similarly, labels having a hierarchical relationship as described above can be considered to have no possible discrepancy.

Some implementations can provide confidence scores or other reliability measures associated and stored with the descriptor labels (e.g., at the data source) to indicate how accurate the descriptor labels are likely to be. Block 306 can obtain such reliability measures with the descriptor labels and use the reliability measures to help determine possible discrepancies. For example, a GPS sensor operating inaccurately may have sensed a different geographic location than the actual location of the sensor/camera and reported this wrong location to the data source providing the descriptor labels in block 304, such that the obtained descriptor labels describe features at the wrong location. If the device knew of the inaccurate GPS sensor operation then it may have associated a low confidence score with the sensed location, and the associated descriptor labels may be provided with a corresponding low confidence score. A descriptor label having a confidence score that does not satisfy a predetermined threshold can be considered to have a possible discrepancy with the image content due its potential low accuracy. In some implementations, the location information associated with the obtained image may have a low confidence score provided by the image capturing device that knew of inaccuracy in location sensing, and such a low confidence score can indicate a possible discrepancy.

If no possible discrepancies are found in block 306, then the method can continue to block 314, described below. In such a case, in some implementations, the method can consider such descriptor labels to be verified, even though no image recognition was performed for verification.

If one or more possible discrepancies between descriptor labels and image are found in block 306, then the method continues to block 308, described below.

Some implementations can omit block 306 and can always perform image recognition on the image in block 308 (described below) to verify the descriptor labels, e.g., without any of the checks and analysis described for block 306. For example, this can cause the method to attempt to verify labels for the image for any type or amount of descriptor labels. For example, such image recognition verification can be performed even if only one descriptor label is obtained for the associated location, since that descriptor label could be inaccurate with regard to the image content.

In block 308, the method determines recognized image features depicted in the image based on image recognition. Any of several well known image recognition techniques, including object recognition, can be used to detect image features in the image, including geographical features. For example, object classes can be determined in the image based on machine learning, where an object recognition technique is trained with many sample images to find objects of particular classes. In another example, a bag-of-visual-words model can be used to treat image features (e.g., small image patches) as words, including building descriptors on the features, keeping occurrence counts of a vocabulary of local image features, and comparing/matching the features against a database of labeled images. Some techniques can use features such as weak supervision and sparse segmentation. Other image recognition techniques can also or alternatively be used, e.g., other pattern matching and feature recognition techniques.

In some implementations, some geographical features can be recognized as generic object types depicted within an image, such as buildings, mountains, lakes, bridges, roads, etc. Some implementations can also recognize known proper names for particular features. For example, if a detected object in the image is sufficiently similar (e.g., over a predetermined similarity threshold) to one or more compared known images of a particular named feature, then a proper name recognized label associated with that known image can be associated with the detected object.

In addition, text and/or symbols (e.g., logos) can be recognized in the image. For example, one or more text recognition techniques can be used to recognize text visible on signs, buildings, monuments, and other features depicted in the image. In some implementations, logos or symbols can be compared and matched to available patterns from a database.

Some object recognition techniques can assign confidence scores or measures to indicate how confidently that features (e.g., objects) in the image have been recognized, how similar the feature is to known objects or other patterns, etc. In some implementations, an image feature can be categorized as recognized/identified (e.g., satisfies (e.g., is above) a predetermined confidence threshold), or unrecognized/unidentified (e.g., does not satisfy the confidence threshold). For example, blurry features may not be identified or recognized in some implementations.

As a result of image recognition for the image, the method can store recognized labels associated with recognized image features. Recognized labels are descriptive words (or other information) describing an associated recognized image feature. One or more recognized labels can be associated with each recognized feature that can be recognized using the image recognition technique(s). For example, such recognized labels can be previously associated with particular object types and classes recognizable by the image recognition technique. For example, an object recognition technique that recognizes object classes can associate a generic descriptive recognized label to each object class, e.g., "person," "building," "bicycle," etc. In some techniques, a known image object with a label that matches a detected object patch (or other image feature) of an image allows the label to be associated with the object patch as a recognized label. In some examples, recognized geographic features in the image such as a lake, building, bridge, road, street, or other features can be provided with the appropriate generic label. Some image recognition techniques can also or alternatively provide proper name recognized labels. For example, particular monuments may be detected (e.g., compared to known images of the monuments) such that a proper name recognized label (e.g., "Eiffel Tower") can be associated with the detected object. Similarly, text within the image can be recognized, such as signs, and used to assign a proper name label to a detected object. For example, a detected building object in the image can be assigned a proper name recognized label of "Joe's Cafe" based on a recognized text sign depicted in the image. In some implementations, any recognized text in the image can be provided in one or more recognized labels.

Some implementations can provide additional recognized labels for the image that may describe other recognized features in an image. For example, if the image recognition techniques detect a lighting feature of the image indicating a sunset or sunrise, e.g., characteristic brightness, color, light/shadow patterns, etc. of such features as specified by predetermined patterns or templates, then a recognized label of "sunset" or "sunrise" can be provided for the image (e.g., and which can also be based on associated time stamp metadata associated with the image that indicates the time of day that the image was captured, and/or based on other metadata of the image and/or data associated with the descriptor labels). Similarly, dark lighting might be associated with a recognized label of "indoors" if suggestive features are recognized in the image, such as lamps or other indoor objects, while a recognized label of "outdoors" can be generated based on particular colors/hues, brightness, and other characteristics found in the image indicative of a depicted outdoor setting. Weather conditions depicted within an image can also be detected and labeled appropriately as recognized labels, e.g., based on characteristics such as hues, brightness, detected objects (e.g., raindrops on camera lens), etc.

Some implementations of method 300 can perform additional operations if image features are not recognized with at least a predetermined amount or level of confidence. For example, block 308 can be performed again using one or more different image recognition techniques in an attempt to better recognize the image features.

Some implementations can examine additional signals related to the image to assist in recognizing image features. For example, such signals can be taken into consideration by the method to assist recognition confidence regardless of how confident the image recognition was performed on the image, or in other implementations, such signals can be considered only if the image recognition techniques performed below a threshold confidence level. The signals can include examining a variety of different characteristics related to the image, metadata of the image and/or data associated with the descriptor labels, etc. For example, in some implementations, the method can examine other images that may be similar in one or more characteristics to the image and thus may depict similar image features. For example, if the method has access to other images captured by the same user or device and/or stored in a similar location to the obtained image, then the capture dates and times of stored images can be compared to the capture date and time of the obtained image. Other stored images captured within a threshold time period (e.g., 1 or 2 hours, or other time period) to the obtained image can be examined with image recognition techniques to recognize image features and determine recognized labels. If features and labels from other images are similar to the features and labels recognized in the first examined image, the method can consider the recognition of the first examined image to be more confident. Or, features and labels recognized from the similar other images can be provided for the obtained image if the image recognition techniques have difficulty recognizing features and labels for the obtained image.

Some implementations can examine features in the image and/or other signals related to the image to assist the recognition of image features. For example, some implementations can examine the number of similar or same-type features recognized in the image to make an inference or assumption that other features are depicted in or describe the image. In some examples, if the image recognition technique detects a large (e.g., over a threshold) number of smiling faces in an image, as detected by well-known facial recognition techniques, this can indicate that the image was captured in a social setting, such as inside a building (e.g., at a party), or in a crowded setting such as a town or city. If several buildings are also detected in the image, then this can further increase the confidence in recognition of a "city" feature in the image and creation of a recognized label of "city" for the image. In some examples, if a large number of cars are detected, especially in an aligned configuration as if parked along a curb, then the method can increase the confidence that a "street" is depicted in the image. In another example, if a large number of windows are detected close to each other and/or in an aligned or other predetermined configuration, then the method can increase the confidence that a building is depicted in the image, even if the borders or outlines of the building are not detected in the image (e.g., because the wall of a building extends past the borders of the image). Some implementations can examine characteristics or personal information related to the user associated with the image to assist recognition or recognized label generation (e.g., if the user has provided permission for use of such personal information). For example, user information indicating locations the user has visited can be coordinated with a timestamp of the image to generate one or more recognized labels for the image based on a visited location.

Some implementations can weight or provide an importance score for recognized image features and the associated recognized labels. For example, the importance score can be an absolute score based on individual criteria, and/or a ranking relative to other recognized image features and labels. The importance score can be based on one or more determined signals, e.g., signals based on the content of the image. For example, the image recognition techniques can determine how much (e.g., percentage) of an entire image area is taken up by a recognized feature, which can influence how much weight or importance to provide other recognized features in the image. In some implementations, some recognized labels can be assigned a greater importance score than other recognized labels based on the depicted content. In one example, a face is determined via facial recognition techniques to take up a large (e.g., over a threshold percentage) of the entire area of the image. Other, smaller features recognized in the image, such as a building or monument located in a background area behind the face in the image, can be given less weight and lower importance score to their recognized labels. The importance score can be used in operations described below, e.g., to filter out some matches or assign matches less confidence, and/or to provide prioritization of verified labels associated with the image.

In block 310, the method compares recognized image features in the image with descriptor labels for similarity to find matches. For example, the descriptor labels can be compared to recognized labels associated with and resulting from the recognition of features in the image as described above. Some implementations can provide a similarity score or other measure indicating how similar the descriptor labels are to the recognized labels (or recognized image features). For example, if only portions of the descriptor labels are the same as recognized labels (e.g., portions of names, terms, or other words/phrases), then an appropriate similarly score can be assigned indicating the amount of similarity (e.g., 50%, 30%, etc.). Some implementations can provide a similarity score or degree of similarity as a match indication result. In some examples, a comparison and similarity score can be determined between a descriptor label and each of the recognized labels, for each obtained descriptor label. Thus a comparison can be made for each combination of descriptor label and recognized label.

In block 312, the method determines the descriptor labels that match and the descriptor labels that do not match the recognized features. The matching descriptor labels can be considered verified labels. Some implementations can consider similarity scores that satisfy a predetermined threshold to be a match between the associated descriptor labels and recognized features. For example, similarity scores that are above a predetermined threshold provide a match, where a higher similarity score indicates a greater similarity. For example, some implementations can look for an exact match in labels (e.g., disregarding punctuation and capitalization, etc.), where a match is considered a 100% similarity between a descriptor label and a recognized label derived from a recognized image feature. In other implementations, a match can be considered present for a similarity above a different threshold similarity, e.g., 80% similarity, 50% similarity, etc. In some examples, a match or non-match can be determined for each combination of descriptor label and recognized label. Descriptor labels having no similarity scores satisfying the threshold can be considered unmatched to any recognized features.

In some cases, there may not be any matches found between descriptor labels and recognized features in the image. For example, the location information provided to the data sources to obtain the descriptor labels may have been wrong, e.g., because of a malfunctioning GPS sensor on a device, thus causing the wrong descriptor labels to be obtained for the image, none of which correspond to features recognized in the image. In such a case, some implementations can indicate all the descriptor labels are not accurate such that none of them are associated with the image (e.g., in block 316 and 318 below). In some cases, the image may not depict any recognizable image features in its content, such that there are no recognized labels or features to compare to the descriptor labels. In such cases, some implementations can skip block 312 and associate all labels with the image (e.g., in block 316 or 318 below).

In some implementations, the method can use synonyms and other close relatives in semantic meaning for descriptor labels and/or for recognized labels to determine if there are any matches between the two sets of labels. For example, the method can consult one or more dictionaries or thesaurus (e.g., stored in storage accessible to the method) to determine synonyms for generic descriptive labels and compare found synonyms to the generic recognized labels. The method can alternatively or additionally determine synonyms for generic recognized labels and compare found synonyms to the generic descriptive labels. In some implementations, hierarchical relatives can be found in a dictionary or other data reference providing such hierarchies, such as parent or child words/terms that are categories for or members of the descriptive labels and/or recognized labels. For example, a parent "building" label can be connected to more-specific child words such as "restaurant," "hotel," or other specific type of building, and all such related child words can be obtained from a dictionary or other accessible information source and compared to the other set of labels to determine if there are any matches. In some implementations, a hierarchical relationship may be already indicated between particular descriptive labels as described above. If a match is found for one descriptive label, then the method can determine that a match is also present for hierarchically-related descriptive labels. For example, if a descriptive label for an individual store in a mall matches a recognized label and has a hierarchical reference to a descriptive label describing the mall, then the mall descriptive label can be considered to also match the recognized label (but other store labels would not match).

Some implementations can designate a particular type (e.g., level or ranking) of verification for each descriptor label, as selected from multiple available types of verification for descriptor labels. Such a verification type can be stored with or in association with the descriptor label, in some implementations. For example, the verification types can include "verified" and "not accurate" types, and additional types in some implementations. For example, a middle verification type can indicate a level of verification above "not accurate" but lower than the most confident "verified" level. In some examples, this middle verification type can be assigned to descriptor labels having more uncertainty than the most confident verification type as to whether they accurately describe one or more image features. For example, a first verification type (e.g., verified) can be assigned to descriptor labels that were found to match recognized label(s) with a high degree of similarity (e.g., over a threshold amount of similarity), and where the matched recognized label(s) were recognized in the image with a higher confidence level (e.g., their associated features were recognized in the image with a confidence over a predetermined recognition threshold confidence level). A middle, lower type of verification level (e.g., uncertain) can be assigned to descriptor labels that did not match any recognized labels, where the recognized labels were not confidently recognized in the image (e.g., the recognized labels are associated with features that were recognized with a recognition confidence below a predetermined threshold recognition confidence level). These are recognized labels that were not confidently recognized, so it is less certain whether the descriptor labels match or do not match actual image features in the image. A third, lowest type of verification level (e.g., not accurate) can be assigned to descriptor labels that did not match any recognized labels (e.g., below a threshold similarity), where the recognized labels were confidently recognized (e.g., associated features recognized with a confidence above the predetermined threshold recognition confidence level). The method is more confident in the inaccuracy of these lowest-level descriptive labels because the non-matching recognized labels were more accurately recognized from the image.

In some implementations, a middle or uncertain verification designation can be assigned to descriptor labels which are not matched to any recognized labels and where only a threshold portion (or less) of the image was found to have recognizable or identifiable image features. For example, the image recognition of block 308 may have determined that only 50% of the area of the image provided identifiable features, which can be considered uncertain as to whether unmatched descriptive labels are depicted in the other, unrecognized 50% of the image. Some implementations can provide additional types (e.g., levels) of verification, e.g., using multiple thresholds or ranges of match similarity and/or image recognition confidence.

In some implementations, if a middle or uncertain type of verification is determined for one or more descriptive labels, the method can examine other signals and/or perform operations that can help decide whether to consider the descriptive labels to be fully verified. For example, the method can prompt for user input indicating whether the descriptor labels are accurate and should be verified, e.g., by displaying the uncertain descriptor labels and the image to the user on a display device of a client device used by the user to allow the user to determine whether the labels are accurate, where an interface can allow the user and select one or more descriptive labels that are verified.

In some implementations, the method can examine weights or other indicators which were previously associated with descriptor labels and which can be taken into consideration as a signal assisting determination of confidence of matches between descriptor labels and recognized labels, and/or for determination of a type of verification for a descriptor label. Matches may be able to be disregarded and/or weighted for accuracy based on such indicators. For example, an associated distance indicator can indicate the physical distance of a feature described in the descriptor label to the associated location, as described above. When determining matches of descriptor labels to recognized labels, the method can consider there to be a more confident or accurate match if the descriptor label has a lower distance (e.g., higher weight), and a less confident match if the descriptor label has a higher distance (e.g., lower weight). Some implementations can use direction indicators associated with descriptor labels (as described above) to filter out and/or weight matches (e.g., the direction indicator indicates a direction or orientation of the described feature with respect to the associated location). For example, a direction of the field of view depicted in the image may be able to be roughly estimated by the method based on the image content, e.g., by examining the timestamp of capture of the image and a direction of sunlight and/or shadows detected in the image. If the direction indicator of a descriptor label is not (approximately) within the estimated directional field of view for the image, then a less confident match can be indicated. In some implementations, less confident matches (e.g., where the associated indicator or weight does not satisfy a predetermined threshold) can be filtered out and not considered a match, and/or can be provided with a middle, uncertain verification type. In contrast, a more confident match can be provided with a more confident or higher-level verification than a less confident match.

If weights or importance scores have been assigned to recognized labels as described above, such weights or scores can be considered in determining matches and/or types of descriptor labels. For example, a low weight or importance score assigned to a recognized label for a small/background image feature can be used to reduce the importance of a match between a descriptor label and the recognized label, thus causing the match to be disregarded (or ranked lower) and the descriptor label to be considered not accurate. For example, this disregard of the match can be performed if other matches are more important, or if there are too many other matches. Or, in some implementations, the descriptor label can be considered accurate and verified but is designated to be of lower importance, e.g., using an importance indicator value stored with the descriptor label.

In some implementations, the method can send a unreliability indication to the data sources from which the descriptor labels were obtained, where the indication can indicate which descriptor labels did not match recognized features in the image. In some implementations, the data source can collect, store, and examine multiple such unreliability indications to determine whether to keep or discard the indicated descriptor labels in its storage (e.g., whether to continue to provide those descriptor labels to requesting devices or users). For example, if a threshold number of such unreliability indications are collected (e.g., from multiple users and devices over time) for a particular location and descriptor label stored by the data source, that descriptor label can be considered incorrect for that location and deleted or otherwise no longer made available from the data source to requestors for that location. In some implementations, the method can send a value indicator to the data sources for each descriptor label obtained from the data sources, where the value indicator indicates how accurately each descriptor label was matched to one or more recognized features in the image. In one example, the value indicator can be scaled to range from 1 to 10 to indicate how well the descriptor label was matched to one or more recognized labels based on similarity and other signals described above. The data source can maintain an averaged, summed, or other collective reliability indicator for a descriptor label that is based on individual indicators received from users and devices over time. In some implementations, the method can adjust a descriptive label and/or a weight or other indicator that was previously associated with a descriptive label by the data sources and send the adjusted label and/or indicator to the data sources. For example, the method may determine, based on examining the image content, that an obtained descriptive label was misspelled. The method may also determine that an image feature is an estimated distance from the associated location of the image capturing device, and has found that an associated distance indicator for the matching descriptive label is sufficiently different than the estimated distance (e.g., over a threshold difference). The method can send to the data source an adjusted descriptive label and adjusted distance indicator based on the estimated distance, and/or an indication that the original distance indicator may be inaccurate.

In block 314, the method can check whether a description of the image location is to be output on a device. For example, a user may desire that a verified description of the image content be displayed on a display screen of a device used by the user, or otherwise output by the device (audio, etc.). If a description is to be output, the method can continue to block 322, described below. Otherwise, the method continues to block 316.

In block 316, the method associates verified labels with the image as metadata. For example, in this block, the verified labels can be the descriptor labels matching one or more recognized labels as found in block 312. In some implementations, the verified labels can be associated as metadata embedded in the image content data. Some implementations can store a reference (e.g. pointer) to the verified labels in the image data or otherwise associated with the image data, e.g., where the verified labels are stored separately from the image data. In some implementations, the method does not associate the non-matching descriptor labels with the image, e.g., ignores, discards, or deletes the non-matching labels, unassociates the non-matching labels with the image, etc. In some implementations, if multiple types or levels of verification can be associated with one or more descriptor labels as described above (unconfident matches, etc.), then the method can associate some or all of these descriptor labels with the image, e.g., according to the desired implementation, and can also associate any indicators of verification types with these descriptor labels. For example, descriptor labels of middle (uncertain) verification type can be associated with the image. Some implementations can also associate other information related to descriptive labels to the image, e.g., as metadata. For example, Some related weights or indicators can be stored associated with a verified label, e.g., indicating the distance and/or direction of the described feature with respect to the associated location, etc.

In block 318, in some implementations, the method can associate other qualified descriptor labels with the image as verified labels and metadata, if appropriate. For example, some descriptor labels may be unmatched to recognized labels or image features as labels (e.g., as text matches), but may still be accurate as to describing the depiction in the image and valuable to the image for labeling purposes (e.g., for search and/or categorization of the image). For example, such descriptor labels can include labels describing non-depicted features as described above that describe or are associated with depicted features in the image, e.g., names of cities, countries, or other areas or regions; postal address information, etc. Some examples of associating unmatched descriptor labels as verified labels are described below with reference to FIGS. 4-5.

In some implementations, the method can also consider one or more recognized labels (associated with recognized image features) to be verified labels, and associate these recognized labels with the image as metadata. For example, a recognized label that did not match any descriptor label may still validly describe a feature of the image, and can be associated with the image. In some implementations, these labels can include types of labels not likely to be included in a descriptor label database, e.g., labels describing moveable features (persons, animals, vehicles, temporary structures, etc.), and/or describing features that are components of other features that may be included in the descriptor label database (e.g., windows or doors as components of a building), etc. In some implementations, unmatched recognized labels can be considered verified labels and are associated with the image only if predetermined conditions or characteristics are met. For example, a predetermined condition can be that the image recognition techniques provided a confidence rating or accuracy rating for the accuracy of the recognition of the features corresponding to these recognized labels, and that rating meets (or is better than) a predetermined threshold, thus indicating a high likelihood of accurate recognition of the feature and an accurate label for the image feature.

Some implementations can filter out some labels and not associate these labels with the image, e.g., even though the labels may have been matched and/or otherwise considered verified in the blocks described above. (Some implementations can also filter out such labels from matching in the blocks described above.) For example, in some implementations, a descriptive label may have an associated importance score, ranking, or weight that is based on an importance score of the matched recognized label as described above. Some implementations can examine the importance score in block 316 or 318 to determine whether to associate the descriptor label with the image. For example, a low importance score can indicate to filter out the associated descriptor label so that the label will not be associated with the image. In other cases or implementations, the importance score and descriptor label can be associated with the image.

In another example, some implementations may desire to limit the number of labels associated with the image, e.g., if there are too many labels (e.g., over a threshold amount) that have been verified for an image. In some examples, a city location may be associated with a large number of descriptive labels within a predetermined area around a location, e.g., describing various stores, monuments, streets, and other geographical features. In contrast, a national park may be associated with very few descriptive labels within the same predetermined area around a location. In some implementations, the method can automatically filter out (e.g., not associate with the image, and/or not use in the matching above) one or more labels if there are more labels than a predetermined threshold number, and some implementations can reduce the number of labels associated with an image to a maximum number. Some implementations can vary a distance or area around the location that is examined for labels, e.g., if descriptive labels include a distance indicator, or if the method (or data source) is able to otherwise determine distances between descriptive-labeled geographic features and the associated location. In some examples, if the image location is in a densely-labeled area, such as a city, the method can designate a smaller area radius around the location (e.g., 200 yards radius) from which descriptive labels are considered, and labels describing features located outside the smaller radius can be ignored. If the image location is situated in a more remote or sparsely-labeled area, such as wilderness, etc., the method can designate a larger area around the location (e.g., 1 mile radius around the location) from which descriptive labels are considered.

In block 320, the method stores or transmits the image (including its label and/or other metadata). For example, the method can store the image in one or more albums of the user or other storage area, e.g., on a storage device local to the device performing the method, and/or to one or more other storage devices (e.g., server, database, network service, etc.) over a network. The method can also or alternatively transmit the image to one or more other devices for display, storage, etc.

At this stage of the method, the image is associated with labels as metadata, where the labels have been verified as described above. In some implementations, a user or system can process the image according to the verified labels. For example, the stored image can be made available for search based on search queries input by users who are searching for particular image content by searching labels associated with images. In one example, if the user inputs a search term to search for all images having a particular label matching the search term, the verified labels of the image can be searched for the search term, and the image can be designated as a match if any of the verified labels match the search term (e.g., are similar within a predetermined threshold similarity score, etc.). Other types of searches can also be performed using the verified labels, including searches utilizing synonyms of a search term, prior search histories and user search preferences, etc.

In some implementations, a user can input additional search parameters besides a label itself to match to other information associated with verified labels. For example, if the verified labels include other information such as weight, importance, level of verification, and/or distance and direction with respect to the associated location, then a search query can specify particular values for one or more of these parameters that search results must satisfy. For example, if a user wishes to search for images that depict features within a particular distance of the image-capturing device, e.g., within 100 yards, then only verified labels that are indicated to be within that distance can be searched as based on a distance indicator of the verified labels, and other verified labels outside that distance range can be excluded. In another example, verified labels having a lower importance score (or lower than a user-designated importance in the search) can be ignored for the search. For example, a user searching for particular features in an image may not want to find an image that depicts those features as minor or background elements, and where non-searched-for features (e.g., a face) are the prominent and primary subjects of the image.

In another example, in some implementations, a search of images based on verified labels can be influenced by the type (e.g., level) of verification of the verified labels. In one example, verified labels having the highest level of verification type can be first presented in a list of search results matching a search query. Verified labels having a lower level of verification (e.g., because image features were not recognized or were recognized with lower confidence) can be ranked lower in search results than the higher-level verified labels. Some implementations of a search can disregard verified labels having a particular verification type, e.g., a lower level verification.

Alternatively or additionally, the verified labels can be indexed in one or more indexes which provide references or pointers allowing access to the associated images of verified labels looked up in the indexes. Images can also be indexed based on any other information associated with the verified labels as described above.

In another example, the image can be categorized or otherwise arranged in a collection of images (and/or other media objects) based on the verified labels. For example, the image can be placed by the method (or system) in various categories that include the verified labels. In some examples, a system can compare a verified label to various category labels provided for a particular category, and if the verified label matches a category label, the image is placed in the associated category. An image can be placed in multiple categories if its verified labels match all those categories. In one example, a system can display all the images in a user's album that are included a category specified by the user. Some implementations can also categorize based on any other information associated with the verified labels as described above (e.g., verification level or type, distance, direction, importance, etc.).

If, as determined in block 314, a description of the location of the image is to be output, then the method continues to block 322 where the method outputs the verified labels (e.g., the descriptor labels matched to recognized features in the image) as a description of the location of the image (some implementations can also output other qualified labels as described for block 318). For example, the output labels can be displayed on a display screen of a device, or otherwise output on an output device. For example, the labels can be output as audio from one or more audio speakers, etc.

In block 324, the method can optionally provide one or more storage options for the image to a user or process. For example, this block can be performed if the user would like an option to store the image after having seen the verified location of the image displayed in block 322. If the user determines that it is an image and/or location that is desirable to him or her, the user can select to store the image (and its metadata), transmit the image, etc. The selection can be made using any input interface of the device (touchscreen, button, pointing device, speech recognizer, etc.). The verified labels can then be associated with the image and the image can be provided for storage or transmission as in blocks 316 to 320 described above.

If the user determines that he or she is not interested in the image, the user can instruct the method to delete the image or otherwise cause the image to be discarded. In one example, a navigation application running on a client device can cause a camera on the device to capture the image at the device's current location, and then the device obtains and verifies descriptor labels for the image as described herein. The verified labels are output to the user of the device to describe the user's current location and the image is then discarded (if desired by the user), since the user only wanted to use the image for verifying the descriptor labels used to describe the current location of the device.

In some implementations, the method can automatically, without user intervention, determine whether to keep or discard the image based on the verified labels. For example, stored user preferences accessible to the method can indicate which geographic locations and features are of interest to the user, and/or which locations and features are of no interest, such that images depicting such geographic locations and features (as indicated in the verified labels) are to be kept or discarded as appropriate.

Some implementations can allow a user to review descriptor labels and recognized labels, and/or to verify, discard, or filter out labels that are being considered at any of the various blocks of the method 300 and/or have been associated with the image. For example, images and their labels can be displayed by a device used by the user (e.g., client device or server device), and an interface can be displayed to allow the user to select and/or verify images and labels as desired using an input device (e.g., touchscreen, button, pointing device, keyboard, voice input microphone, etc.). Some implementations can also allow a user to similarly review and/or modify other information associated with various labels, e.g., distance and direction indicators, verification type, importance score, etc.

It should be noted that the blocks described in the methods of FIGS. 2 and 3 can be performed in a different order than shown and/or simultaneously (partially or completely) with other blocks, where appropriate. Not all of the described blocks need be performed in various implementations. In some implementations, blocks can be performed multiple times, in a different order, and/or at different times in the methods. In some implementations, the methods 200 and 300 can be implemented, for example, on a server system 102 as shown in FIG. 1. In some implementations, one or more client devices can perform one or more blocks instead of or in addition to a server system performing those blocks.

FIG. 4 is a diagrammatic illustration of an example image 400 and location information that can be processed using one or more features described herein to verify labels associated with the image. In various implementations, image 400 can be displayed on a display device, e.g., of a client device 120, 122, 124, and/or 126 of FIG. 1, or a server system 102 in some implementations. In other implementations, the image 400 can be processed as described herein without being displayed, or being displayed after all processing is complete. In one example, a user can view image 400 displayed in an interface on a client device.

Image 400 can be obtained by a system as described above with reference to FIGS. 2 and 3. Location information 402 is associated with image 400, e.g., geographic location metadata that was sensed by a device capturing the image or a device located at or near where the image was captured, using, for example, GPS sensors. In this example, the location information includes location coordinates 402, e.g., a representation of latitude and longitude in some implementations.

In this example, the location information 402 is used to obtain one or more descriptor labels. For example, the system can query one or more descriptor label databases that are available over a network including the Internet. Such databases store descriptor labels provided previously by administrators, users, and/or information sources that are associated with particular locations, e.g., describing features of public interest located within a predetermined area around an associated location point. In this example, the system provides the location information 402 to a geolocation server over a network, and the server looks up the location information in one or more label databases accessible to the server. The server retrieves the descriptor labels stored in association with the location information, e.g., stored in an entry referenced by the location information. The server provides the retrieved descriptor labels to the system over the network.

FIG. 5 shows a number of example labels used by the system processing image 400 according to one or more features herein. A set of descriptor labels 500 is obtained by the system, in this example from a queried database server. The labels stored by the database server are based on available online map information and/or address information, user-submitted information, and/or administrator-submitted information. For example, the descriptor labels 500 include proper names, e.g., proper names of features such as businesses and streets in the vicinity of the geographic location indicated by the location information. For example, these features can be within a predefined distance of the location represented by the location information (e.g., 100 feet), within a tolerance distance of the location sensor's accuracy, etc. In this example, the descriptor labels 500 also include a proper name of a city surrounding the location, e.g., a city ("Newpark City") in which the location is located. The descriptor labels 500 also include generic descriptive terms describing these and other features, such as "building" and "street."

In some implementations, the system can check the descriptor labels 500 without yet checking the image to determine whether one or more factors are present indicating a possible discrepancy between one or more descriptor labels and the content of the image. For example, multiple descriptor labels are present that describe proper names, as indicated by their capitalization or other characteristics. Two of these proper names, "Nell's Market" and "University Cafe," are determined by the system to be at the same descriptive level, e.g., they are determined by the system to not be known higher-level proper names of cities, parks, states, countries, or other areas in which the geographic location of the image could be located, e.g., based on lookups into directories storing such proper names. Thus, since both of the features described by these proper names may not be depicted in the image 400, the system determines that there may be a possible discrepancy between descriptor labels and the content of the image, and that image recognition should be performed.

The system performs image recognition (or requests a connected system to perform the image recognition) on image 400, e.g., using one or more image recognition techniques, and the list of recognized labels 502 is determined. In some implementations, the recognized labels 502 can be labels associated with images or image patterns that have been matched to objects detected within the image 400. For example, the object recognition can detect objects such as windows, door, sign, persons, and the building within the image 400 and those objects are matched to pattern or model image objects that have the labels "window", "door", "sign," "person," and "building" associated with them, thus generating the recognized labels 502. Other implementations can also generate other recognized labels such as "outdoors", "daylight," etc. (not shown) based on recognized characteristics of the image.

The system compares the descriptor labels 500 with the recognized labels 502. For example, the system can compare each descriptor label 500 with all the recognized labels 502 to look for matches. In some examples, a match can be defined as at least a threshold similarity between a descriptive label and a recognized label.

In this example, the system has found matching descriptor labels 504 which match one or more recognized labels 502. These are considered verified labels. Several descriptor labels 500 did not have matches to any recognized labels 502. For example, an object generating a recognized label of "Nell's Market" was not found by the image recognition process, so the descriptive label "Nell's Market" is not present in the matched labels 504. In this example, the object (e.g., building) described by the descriptive label "Nell's Market" is near the location where the image 400 was captured, and so was associated with the location in the descriptor label database. However, this object is not visible in the image 400 and so was not recognized and described in any of the recognized labels 502. For example, this object might have been positioned to the rear of the camera that captured image 400, or to one side of the image 400 and out of view of the camera.

The system stores the verified labels 504 in association with the image 400. For example, the system can store the verified labels as embedded data in the image data, or can store the labels as data separate from the image 400 and referenced by metadata stored in the image 400. The system causes the other descriptor labels 500 that do not match any of the recognized labels 502 to be unassociated with the image 400, e.g., discarded, ignored for association, or removed from the image (e.g., if previously embedded).

In some implementations, the system can check whether any of the unmatched descriptor labels 500 have one or more characteristics allowing one or more of them to be approved by the system and stored in association with the image 400. For example, proper names describing higher-level non-depicted features such as area and region designations or other features that may not be visible in an image or not recognized by utilized image recognition processes can be associated with the image 400 in some implementations, regardless of whether they were matched to recognized labels. In some examples, such non-depicted features can be provided in predetermined lists or databases for the system to check against. For example, known proper names for areas in which the image capture was located, such as cities, counties, provinces, countries, parks, streets, etc. can be considered such features. In some implementations, the system can check the descriptive label for matches in databases listing proper names of such features to verify whether the label describes one of these features. In some implementations, these types of proper name labels can automatically be approved by the system as verified labels for association with the image 400. In some implementations, if processing time and resources allow, the system can verify whether the name label describes a feature near the geographic location of the image by checking online databases and/or map information. For example, in FIG. 5, the system can determine that the "Newpark City" descriptor label is a city by checking a city database and/or by detecting the term "city" in the label, and can associate this label with the image 400.

In some implementations, the system can determine whether an unmatched descriptor label 500 is a proper name label that corresponds to a matched generic descriptive label (or generic recognized label), and so should be associated with the image. For example, the system can determine whether a matched generic label does not have a corresponding matched proper name label. In one example, the system can check whether there is a matched business name or organization name label that corresponds to a matched generic label of "building" (e.g., where a business name can be detected based on looking for words like "restaurant," "store," "market," "inc.," etc. within the proper name, in some implementations). Similarly, the system can check whether there is a matched street name label that corresponds with a matched generic label of "street" (e.g., where a street name can be detected based on words like "Street," "Avenue," "Circle,", or well-known abbreviations of these). If the system determines that there is not a matched proper name label corresponding to a matched generic label, then the system can check whether any of the unmatched descriptor labels 500 could be proper names of the feature described by the matched generic label, and if this is the case, verify the proper name label and associate the proper name label with the image. In the example of FIG. 5, the system detects that the matched generic descriptor label "building" has a (possible) matched proper name descriptor label "University Cafe" by detecting the known "cafe" term of that label as a business name, and so stops the inquiry. The system also detects that the matched generic descriptor label "street" has no corresponding matched proper name descriptor labels with a known street proper name. The system checks the unmatched descriptor labels and finds that two of the unmatched labels ("Main Street" and "First Ave.") are proper names of streets (based on terms "Street" and "Ave"). However, since there are two street descriptor labels, the system can reject them in some implementations (e.g., if the system has not recognized in the image content that the image was captured/located at a street intersection). If one proper name street label was present in the unmatched descriptor labels, then the system could verify that that descriptor label and associate it with the image 400.

In some implementations, the method can associate one or more of the recognized labels 502 with the image 400 as verified labels. For example, the recognized labels 502 that do not match any descriptor labels 500 can be considered verified labels and associated with the image 400 if predetermined conditions are met. In one example, a predetermined condition can require that the image recognition process provided a confidence rating or accuracy rating for the accuracy of the recognition of the objects corresponding to these recognized labels, where that rating meets (or is better than) a predetermined threshold, thus indicating a high likelihood of accurate recognition of the image feature and thus an accurate recognized label for the feature. In this example, the unmatched recognized labels 502 "window," "door," "sign," and "person" could be considered verified labels and stored as associated with the image 400 if they meet such predetermined conditions (if any), respectively. In some implementations, if the system did not recognize the "building" label directly from image content, the system can determine that a number of "window" objects and/or "door" objects have been recognized, and so a recognized label of "building" can also be added to the list 502 of recognized labels based on the number and/or arrangement of the recognized window and door objects.

Figure 6:
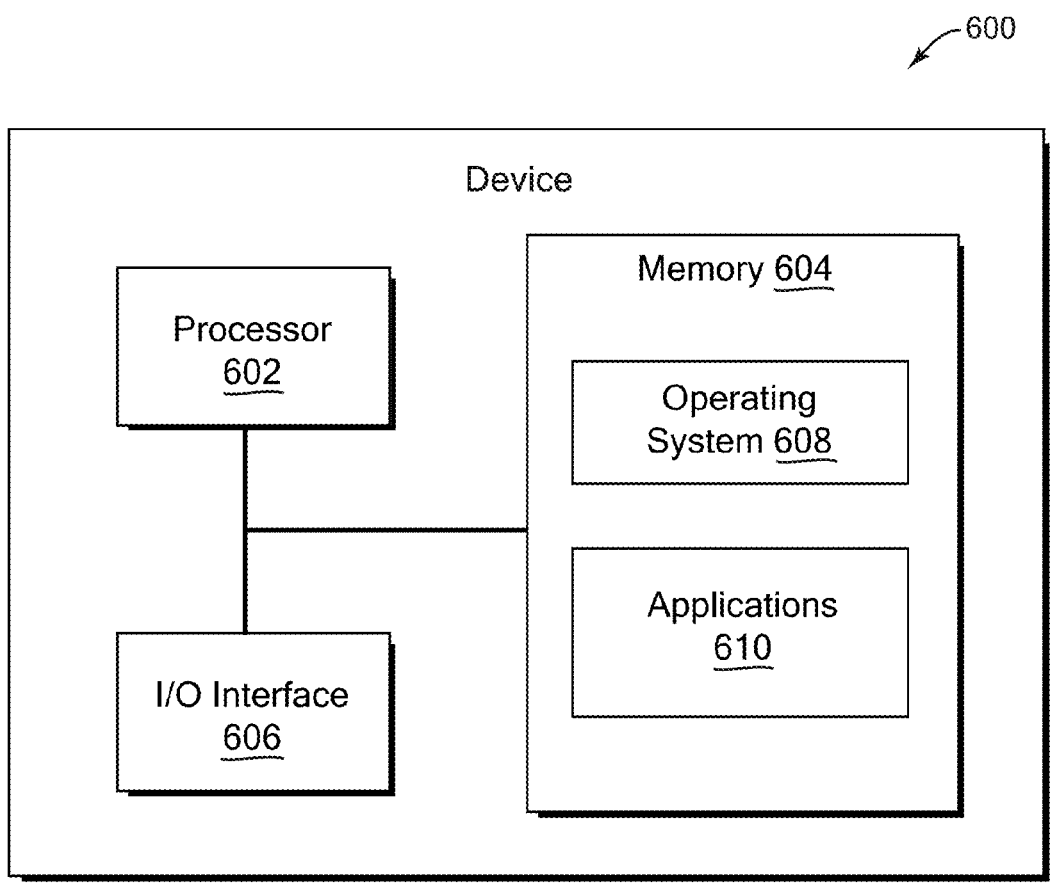
FIG. 6 is a block diagram of an example device which may be used for one or more implementations described herein.

FIG. 6 is a block diagram of an example device 600 which may be used to implement some implementations described herein. In some implementations, device 600 may be used to implement a server device, e.g., server device 104 of FIG. 1, and perform appropriate method implementations described herein. Server device 600 can be any suitable computer system, server, or other electronic or hardware device. For example, the server device 600 can be a mainframe computer, desktop computer, workstation, portable computer, or electronic device (portable device, cell phone, smart phone, tablet computer, television, TV set top box, personal digital assistant (PDA), media player, game device, etc.). In some implementations, server device 600 includes a processor 602, a memory 604, and input/output (I/O) interface 606.

Processor 602 can be one or more processors or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608 and one or more applications engines 610 such as a graphics editing engine, web hosting engine, social networking engine, etc. In some implementations, the applications engines 610 can include instructions that enable processor 602 to perform the functions described herein, e.g., some or all of the methods of FIGS. 2 and 3.

Any of software in memory 604 can alternatively be stored on any other suitable storage location or computer-readable medium. In addition, memory 604 (and/or other connected storage device(s)) can store images, location data, descriptor labels and recognized labels, other information associated with labels, database information, dictionary and map information, image recognition patterns and other information, and/or other instructions and data used in the features described herein. Memory 604 and any other type of storage (magnetic disk, optical disk, magnetic tape, or other tangible media) can be considered "storage devices."

I/O interface 606 can provide functions to enable interfacing the server device 600 with other systems and devices. For example, network communication devices, storage devices such as memory and/or database 106, and input/output devices can communicate via interface 606. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 6 shows one block for each of processor 602, memory 604, I/O interface 606, and software blocks 608 and 610. These blocks may represent one or more processors or processing circuitries, operating systems, memories, I/O interfaces, applications, and/or software modules. In other implementations, server device 600 may not have all of the components shown and/or may have other elements including other types of elements instead of, or in addition to, those shown herein. While system 102 is described as performing blocks and operations as described in some implementations herein, any suitable component or combination of components of system 102 or similar system, or any suitable processor or processors associated with such a system, may perform the blocks and operations described.

A client device can also implement and/or be used with one or more features described herein, such as any of client devices 120-126 shown in FIG. 1. Example client devices can include some similar components as the device 600, such as processor(s) 602, memory 604, and I/O interface 606. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, a display device for outputting images or video, or other output devices. A display device, for example, can be used to display the images pre- and post-processing as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A method comprising:
   obtaining, using at least one processor, an image associated with geographic location information, the geographic location information indicative of an associated geographic location;
   obtaining, using at least one processor, one or more descriptor labels associated with the geographic location information;
   determining, using at least one processor, one or more recognized image features depicted in the image, wherein the one or more recognized image features depict one or more geographic features of the geographic location, wherein the recognized image features are recognized in the image based on one or more object recognition techniques, wherein the one or more recognized image features are associated with one or more confidence scores, each of the one or more confidence scores indicating an amount of confidence in the recognition of the associated image features;
   comparing, using at least one processor, the one or more recognized image features with the one or more descriptor labels; and
   determining, using at least one processor, one or more verified labels from the one or more descriptor labels, wherein determining one or more verified labels is based at least in part on the one or more confidence scores, wherein the one or more verified labels are verified to describe at least one of the one or more recognized image features depicted in the image based on the comparing of the one or more recognized image features with the one or more descriptor labels.

2. The method of claim 1 further comprising storing, using at least one processor, the one or more verified labels as associated with the image.

3. The method of claim 1 further comprising causing, using at least one processor, at least one of the descriptor labels that do not describe at least one of the one or more recognized image features to be unassociated with the image.

4. The method of claim 1 wherein the location information includes Global Positioning System (GPS) location information associated with the image as metadata.

5. The method of claim 1 wherein the one or more descriptor labels originated from one or more data sources that store the one or more descriptor labels in association with the location information.

6. The method of claim 1 wherein the descriptor labels include at least one of: a proper name of a geographic feature, and a generic descriptive term for a geographic feature, and wherein the one or more geographic features include at least one of: a monument, a landmark, a building, and a landscape feature.

7. The method of claim 1 wherein comparing the one or more recognized image features with the one or more descriptor labels includes comparing one or more recognized labels associated with the one or more recognized image features with the one or more descriptor labels, and
   wherein determining one or more verified labels from the one or more descriptor labels includes checking for one or more matches between the one or more descriptor labels and the one or more recognized labels, wherein each matching descriptor label is a verified label.

8. The method of claim 1 further comprising determining an importance score for at least one of the one or more recognized image features based on at least one of:
   a size of the at least one recognized image feature relative to an area of the image; and
   a type of the at least one recognized image feature,
   wherein the determining of the one or more verified labels is based at least in part on the importance score.

9. The method of claim 1 wherein determining one or more verified labels from the one or more descriptor labels includes checking for one or more matches between the one or more descriptor labels and the one or more recognized image features, wherein each matching descriptor label is a verified label, and
   wherein the matches are determined based on checking for a predetermined threshold amount of similarity found between the one or more descriptor labels and the one or more recognized image features, wherein the predetermined threshold amount of similarity is checked based on at least one similarity score indicating an amount of similarity between the one or more descriptor labels and the one or more recognized image features.

10. The method of claim 1 further comprising:
    examining, using at least one processor, the one or more descriptor labels without examining content of the image to determine whether one or more possible discrepancies are present between at least one of the descriptor labels and the content of the image, wherein the determining whether one or more possible discrepancies are present includes at least one of:
    determining whether the one or more descriptor labels are a plurality of descriptor labels,
    determining whether at least one of the one or more descriptor labels have an associated confidence score that does not satisfy a threshold; and
    determining whether at least one of the one or more descriptor labels have a particular type or are present on a stored list of labels, wherein the determining of the one or more recognized image features is performed only in response to determining that the one or more possible discrepancies are present.

11. The method of claim 1 wherein determining one or more verified labels includes determining a plurality of verification levels for the one or more descriptor labels, wherein at least one of the plurality of verification levels indicates a less confident verification than at least one other of the plurality of verification levels.

12. The method of claim 7 further comprising checking, using at least one processor, at least one of the descriptor labels that do not match at least one of the one or more recognized image features for one or more predetermined characteristics or conditions allowing the at least one descriptor label to be associated with the image, wherein the one or more predetermined characteristics or conditions include at least one of:
the at least one descriptor label describes a higher-level geographic feature that includes at least one of the one or more recognized image features; and
the at least one descriptor label is associated with at least one of the matching descriptor labels.

13. The method of claim 1 further comprising causing, using at least one processor, the image and the one or more verified labels to be available as a search result for searches input by a user for information in the one or more descriptor labels.

14. A system comprising:
a storage device; and
at least one processor accessing the storage device and operative to perform operations comprising:
obtaining an image associated with geographic location information;
obtaining one or more descriptor labels associated with the geographic location information;
determining one or more recognized image features depicted in the image, wherein the one or more recognized image features are associated with one or more confidence scores, each of the one or more confidence scores indicating an amount of confidence in the recognition of the associated image features;
comparing the one or more recognized image features with the one or more descriptor labels;
determining one or more verified labels from the one or more descriptor labels, wherein determining one or more verified labels is based at least in part on the one or more confidence scores, wherein the one or more verified labels are determined to describe at least one of the one or more recognized image features depicted in the image based on the comparing of the one or more recognized image features with the one or more descriptor labels; and
causing at least one of the one or more descriptor labels that do not describe at least one of the one or more recognized image features to be unassociated with the image.

15. The system of claim 14 wherein comparing the one or more recognized image features with the one or more descriptor labels includes comparing one or more recognized labels associated with the one or more recognized image features with the one or more descriptor labels, and further comprising:
storing the one or more verified labels as associated with the image.

16. The system of claim 14 wherein the one or more descriptor labels originated from one or more data sources that store the one or more descriptor labels in association with the location information, and further comprising:
sending an unreliability indication to the one or more data sources, wherein the unreliability indication is associated with the at least one descriptor label that does not describe the at least one recognized image feature.

17. A non-transitory computer readable medium having stored thereon software instructions that, when executed by a processor, cause the processor to perform operations including:
obtaining an image associated with geographic location information;
obtaining one or more descriptor labels associated with the geographic location information;
determining one or more recognized image features depicted in the image, wherein the one or more recognized image features are associated with one or more confidence scores, each of the one or more confidence scores indicating an amount of confidence in the recognition of the associated image features;
comparing the one or more recognized image features with the one or more descriptor labels;
determining verified labels from the one or more descriptor labels, wherein determining one or more verified labels is based at least in part on the one or more confidence scores, wherein the verified labels are determined to describe at least one of the one or more recognized image features depicted in the image based on the comparing of the one or more recognized image features with the one or more descriptor labels;
causing the one or more verified labels to be associated with the image; and
causing at least one of the descriptor labels that do not describe at least one of the one or more recognized image features to be unassociated with the image.

18. The computer readable medium of claim 17 wherein comparing the one or more recognized image features with the one or more descriptor labels includes comparing one or more recognized labels associated with the one or more recognized image features with the one or more descriptor labels, and
wherein the geographic location information is indicative of an associated geographic location, and wherein the one or more recognized image features depict one or more geographic features of the geographic location.

* * * * *